United States Patent Office 2,837,547
Patented June 3, 1958

2,837,547

POLYMERIZATION OF UNSATURATED TRIGLYCERIDES

Carl J. Ish, Columbus, Ohio, assignor, by mesne assignments, to Pennsalt Chemicals Corporation, a corporation of Pennsylvania No Drawing. Application December 30, 1955
Serial No. 556,390

3 Claims. (Cl. 260—407)

This invention relates to the polymerization of unsaturated fatty acids of polyhydric alcohols and the production therefrom of waxlike materials suitable for such uses as paint extenders and other uses where low-melting-point, waxlike materials are desired. More particularly, this invention relates to the polymerization of the triglyceride esters of unsaturated fatty acids as contained in drying oils and the like, and the aqueous treatment of anhydrous hydrogen fluoride solutions of the polymerization product to yield the relatively soft, waxlike materials.

In general, this invention is based upon the discovery that drying oils and similar oils can be polymerized by anhydrous hydrogen fluoride to yield polymeric materials which are soluble in the anhydrous hydrogen fluoride, the solutions of which yield relatively soft, waxlike materials upon flooding the solution with water. The materials polymerized and treated according to this invention to yield the waxlike products are drying oils, including semi-drying oils, and similar oils containing triglycerides wherein the principal triglyceride is at least one unsaturated fatty acid triglyceride. The unsaturated fatty acid triglycerides and mixtures treated according to this invention must have a sufficient degree of unsaturation so as to yield solid polymers upon polymerization with anhydrous hydrogen fluoride. Drying oils have a relatively high degree of unsaturation, exhibiting iodine values ranging from about 100 to over 200 and produce solid polymeric reaction products upon contact with anhydrous hydrogen fluoride. The drying oils include cottonseed oil, corn oil, soybean oil, oiticica oil, tung oil, linseed oil, and perilla oil. Other similar oils, but which contain lesser amounts of unsaturated fatty acid triglycerides, such as peanut oil, castor oil, olive oil, and lard oil, produce solid polymeric reaction products upon contact with anhydrous hydrogen fluoride, the reaction products being characterized by decreasing hardness with decreasing iodine values until coconut oil with an iodine value of about 10 does not yield a solid polymer but merely exhibits an increase in viscosity. For the sake of brevity, these unsaturated triglycerides and mixtures thereof, as represented by drying oils and similar oils having an iodine value of greater than about 10 capable of yielding a solid polymeric reaction product when treated with anhydrous hydrogen fluoride, shall be referred to as "unsaturated triglycerides."

The unsaturated triglycerides may be polymerized to form a solid, firm, rubberlike product by treatment with anhydrous hydrogen fluoride and distillation of hydrogen fluoride. The amount of anhydrous hydrogen fluoride necessary to polymerize the unsaturated triglyceride may vary over a wide range from catalytically small amounts, usually of the order of about one percent by weight, to very large amounts, such as equal parts of anhydrous hydrogen fluoride to the unsaturated triglycerides, and greater. The addition of catalytic amounts of anhydrous hydrogen fluoride to the unsaturated triglycerides at about normal atmospheric room temperature produces an almost immediate formation of a solid polymer exhibiting rubberlike characteristics, the firmness of which is dependent upon the degree of unsaturation of the triglycerides. Alternatively, substantially greater amounts of anhydrous hydrogen fluoride may be added to the unsaturated triglycerides with the formation of the solid polymer upon the removal of the anhydrous hydrogen fluoride, as by distillation. The use of smaller catalytic amounts of hydrogen fluoride in the production of the solid rubberlike polymer has the obvious advantage of quick removal of the anhydrous hydrogen fluoride which may be easily accomplished by the simple evaporation in a stream of air or other gas.

Rubberlike polymers resulting from the polymerization of the unsaturated triglycerides by means of the anhydrous hydrogen fluoride have been found to be soluble in all proportions in anhydrous hydrogen fluoride. When anhydrous hydrogen fluoride solutions of these polymers are flooded with water, a relatively soft, waxlike material is formed and separates out from the solution. This material differs markedly in its waxlike characteristics from the rubberlike polymerization product initially obtained. Further, the rubberlike polymerization product also exhibits a greater degree of firmness than the waxlike material separated from the anhydrous hydrogen fluoride solution by water washing. The waxlike material somewhat resembles factice in its physical properties in that it is compressible but is practically devoid of tensile strength and ability to elongate, as described in Hutchinson's Technical and Scientific Encyclopedia, volume II, page 888. Although compressible, the waxlike material does not exhibit any substantial compressible elasticity. Although exhibiting facticelike physical properties, the waxlike material and factice apparently are of different chemical composition. It is not apparent whether the initial rubberlike polymerization product is chemically different from the subsequently obtained waxlike material, but the waxlike and easily deformable characteristics of the material obtained by the water washing of the solution are different from the characteristics of the product obtained by evaporation or distillation removal of the anhydrous hydrogen fluoride. Surprisingly, redissolution of the relatively soft, waxlike material in anhydrous hydrogen fluoride and removal of the anhydrous hydrogen fluoride by distillation yields again a firm, rubberlike product apparently identical to the product initially obtained.

The separation of the firmer, rubberlike polymeric reaction product is not necessary in the production of the soft, waxlike material. Thus, anhydrous hydrogen fluoride may be added to the unsaturated triglycerides to form a solution and then this solution may be directly flooded with water to separate out the waxlike material. Dissolution of the relatively soft, waxlike material in anhydrous hydrogen fluoride and removal of the anhydrous hydrogen fluoride by means of evaporation or distillation yields the firmer, rubberlike polymerization product obtainable by direct polymerization of the unsaturated triglycerides with anhydrous hydrogen fluoride.

The following examples are illustrative of the invention.

Example I-A

Approximately equal parts of soybean oil, having an iodine value of about 130, and anhydrous hydrogen fluoride were charged into a closed container and agitated for about one-half hour at room temperature (about 20 to 25° C.). The anhydrous hydrogen fluoride was then distilled off at 65° C. at atmospheric pressure. The product remaining after the distillation was a dark brown, rubberlike polymeric product. This product is insoluble in water, 95 percent ethyl alcohol, xylene, and petroleum spirits.

Example I-B

Redissolution of the polymeric reaction product of Example I-A in anhydrous hydrogen fluoride and flooding of the solution with an excess of water produces a soft, waxlike material which separates from the solution. This material differs from the polymeric reaction product of Example I-A by being softer, more readily deformable to the application of pressure, and waxlike.

Example II-A

Approximately equal parts of cottonseed oil, having an iodine value of approximately 107, and anhydrous hydrogen fluoride were charged into a closed container and agitated for about one-half hour at room temperature. The anhydrous hydrogen fluoride was then removed by distillation at 65° C. at atmospheric pressure. The oil had polymerized, yielding a brown-to-black rubberlike product. This product is isoluble in water, 95 percent alcohol, xylene and petroleum spirits.

Example II-B

Dissolution of the reaction product of Example II-A in anhydrous hydrogen fluoride and flooding the solution with an excess of water causes the separation of a relatively soft and waxlike material, as compared to the firm and rubberlike reaction product of Example II-A.

Example II-C

Redissolution of this relatively soft, waxlike material in anhydrous hydrogen fluoride and removal of the hydrogen fluoride by distillation yields a reaction product apparently identical in all respects to the reaction product of Example II-A.

Example III-A

Approximately equal parts of corn oil, having an iodine value of approximately 123, and anhydrous hydrogen fluoride were charged into a closed container and agitated for about one-half hour at room temperature. The anhydrous hydrogen fluoride was then removed by vaporization at 65° C. at atmospheric pressure. The oil had polymerized, giving a brown-to-black polymer, with rubberlike properties. This product is insoluble in water, 95 percent ethyl alcohol, xylene, and petroleum spirits.

Example III-B

The polymeric reaction product of Example III-A is soluble in anhydrous hydrogen fluoride, the solutions of which yield a relatively soft, waxlike material upon flooding the solution with water. Characteristic of these relatively soft, waxlike modifications of the firmer, rubberlike polymeric reaction products, the waxlike material is soluble in anhydrous hydrogen fluoride and yields the firmer, rubberlike polymeric product upon removal of the anhydrous hydrogen fluoride by distillation or evaporation.

Example IV-A

Approximately equal parts of peanut oil, having an iodine value of about 85, and anhydrous hydrogen fluoride were charged into a closed container and agitated for about one-half hour at room temperature. The anhydrous hydrogen fluoride was then removed by distillation at about 65° C. The oil had polymerized, yielding a somewhat sticky, black, rubberlike polymeric material. This material is insoluble in water, 95 percent ethyl alcohol, white gasoline, acetone, and benzene.

Example IV-B

The reaction product of Example IV-A is soluble in anhydrous hydrogen fluoride, the solutions of which yield a comparatively softer material than the product of Example IV-A and having waxlike characteristics. This relatively soft, waxlike material can be redissolved in anhydrous hydrogen fluoride and produces a polymer apparently identical to the rubberlike polymer of Example IV-A upon removal of the anhydrous hydrogen fluoride by distillation.

Example V-A

Approximately equal parts of linseed oil, having an iodine value of about 180, and anhydrous hydrogen fluoride were charged into a closed container and agitated for about one-half hour at room temperature. The hydrogen fluoride was then removed by distillation at 65° C. at atmospheric pressure, and subsequently at reduced pressure to facilitate complete removal of the anhydrous hydrogen fluoride. This product was a solid polymer, black in color, and exhibited very rubberlike characteristics. This product is insoluble in water, 95 percent ethyl alcohol, white gasoline, acetone, and benzene.

Example V-B

Linseed oil was treated with a catalytically small amount of anhydrous hydrogen fluoride (approximately one percent by weight of the oil) and yielded a solid polymer, black in color, and exhibiting very rubberlike properties, to all appearances identical to the polymer obtained in Example V-A. This product exhibited insolubilities similar to those of the product of Example V-A. The anhydrous hydrogen fluoride may be removed by evaporation by subjecting the product to a stream of gas at room temperatures, or, alternatively, by distillation at higher temperatures if rapid removal is desired.

Example V-C

The rubberlike polymers of Examples V-A and V-B are soluble in anhydrous hydrogen fluoride, the solutions of which yield a relatively soft, waxlike material upon flooding the solutions with water.

Example VI-A

Approximately equal parts of lard oil, having an iodine value of about 60, and anhydrous hydrogen fluoride were charged into a closed container and agitated for approximately one-half hour at room temperature. The anhydrous hydrogen fluoride was removed by distillation at 65° C. at atmospheric pressure, and subsequently at reduced pressure at 65° C. to facilitate complete removal of the anhydrous hydrogen fluoride. The resulting product was a solid, tacky, polymer, dark in color, and having somewhat rubberlike properties. The product is insoluble in water, 95 percent ethyl alcohol, white gasoline, acetone, and benzene. The tackiness of this polymer, as compared with the polymers of the other examples obtained by vaporization of the anhydrous hydrogen fluoride by means of distillation or evaporation in a stream of gas, is believed due to the lower degree of unsaturation in this oil. This tacky, rubberlike polymeric product is soluble in anhydrous hydrogen fluoride, the solutions of which yield a material differing from the tacky, rubberlike polymer in being somewhat softer and having a waxlike characteristic. This waxlike material can be reconverted to the rubber-like product on redissolution of the waxlike material in anhydrous hydrogen fluoride, and removal of the anhydrous hydrogen fluoride by distillation or evaporation.

Example VII-A

Illustrative of the catalytic activity of the anhydrous hydrogen fluoride in polymerizing unsaturated triglycerides, a small drop of anhydrous hydrogen fluoride on the surface of olive oil (iodine value about 80 to 88), castor oil (iodine value about 81 to 87), and oiticica oil (iodine value about 130 to 155) rapidly was accompanied with the formation of globules of solid polymeric reaction products. The speed at which the entire mass of these oils is polymerized by these relatively small amounts of anhydrous hydrogen fluoride is increased by agitating the oils. This indicates that the polymerization reaction is a catalytic reaction. The rate of such reaction can be increased by the application of pressure or both pressure and elevated temperatures.

A comparison of these polymeric products obtained from the polymerization of the olive oil, castor oil, and oiticica oil shows the differences in the firmness and rubberlike properties resulting from unsaturated triglycerides of different degrees of unsaturation. The polymeric product resulting from the olive oil and castor oil are less firm than the polymeric product obtained from the oiticica oil. The latter polymeric product is harder and closely resembles hard rubber in this respect. Dissolution of these initial polymeric reaction products in anhydrous hydrogen fluoride and water flooding of the solutions in all cases yields a material softer than the initial polymeric product, and is more waxlike than rubbery. Rubbery or rubberlike is intended to describe the ability of the polymeric products to rebound when dropped upon a hard surface. In contrast, waxlike materials produced from water flooding of the solutions do not exhibit such properties, or do so only to a lesser degree.

The above description and examples have been given for the sake of illustration of the invention, and not for the purpose of limiting the invention specifically to the disclosure therein. Obviously, many modifications and variations of the invention as hereinbefore set forth may be made without departing from the spirit and scope thereof. Therefore, only such limitations should be imposed as are indicated in the following claims.

What is claimed is:

1. The process comprising flooding with water an anhydrous hydrogen fluoride solution of unsaturated triglycerides and separating therefrom a relatively soft, waxlike material which is different from a solid, rubberlike polymeric product obtainable from said solution by anhydrous removal of the hydrogen fluoride.

2. The process of modifying solid, rubberlike polymeric products obtained by the action of anhydrous hydrogen fluoride on unsaturated triglycerides comprising dissolving the solid rubberlike polymeric products in anhydrous hydrogen fluoride, flooding the resulting solution with water, and separating therefrom a material differing from said polymeric product characterized by being, in comparison therewith, relatively soft and waxlike.

3. The process of modifying solid, rubberlike polymeric products obtained by the action of anhydrous hydrogen fluoride on drying oils comprising dissolving the solid rubberlike polymeric products in anhydrous hydrogen fluoride, flooding the resulting solution with water, and separating therefrom a material differing from said polymeric product characterized by being, in comparison therewith, relatively soft and waxlike.

References Cited in the file of this patent

UNITED STATES PATENTS 2,670,361     Croston et al. _____ Feb. 23, 1954

FOREIGN PATENTS 551,787     Germany _____ June 4, 1932

OTHER REFERENCES

Croston et al.: J. Am. Oil Chemists' Soc., vol. 29 (1952), pp. 313–333.